United States Patent [19]
Moggi et al.

[11] Patent Number: 4,742,126
[45] Date of Patent: May 3, 1988

[54] PROCESS FOR PREPARING UNSATURATED FLUOROELASTOMERS

[75] Inventors: Giovanni Moggi, Milan; Piergiorgio Bonardelli, Brescia; Graziella Chiodini, Saronno; Stefano Conti, Monza, all of Italy

[73] Assignee: Ausimont S.p.A., Milan, Italy

[21] Appl. No.: 4,568

[22] Filed: Jan. 20, 1987

Related U.S. Application Data

[63] Continuation-in-part of Ser. No. 836,125, Mar. 4, 1986, abandoned.

[30] Foreign Application Priority Data

Mar. 6, 1985 [IT] Italy ............................. 19789 A/85

[51] Int. Cl.$^4$ ............................................. C08F 8/00
[52] U.S. Cl. ................................. 525/340; 525/326.2; 525/326.4; 525/359.1; 525/374; 525/379
[58] Field of Search ................... 525/340, 359.1, 374, 525/379

[56] References Cited

U.S. PATENT DOCUMENTS 3,252,954  5/1966  Calfee et al. .................... 525/326.4
3,560,595  2/1971  Phillips et al. .................. 525/326.4

FOREIGN PATENT DOCUMENTS 1152208  5/1969  United Kingdom .

Primary Examiner—Joseph L. Schofer
Assistant Examiner—Bernard Lipman
Attorney, Agent, or Firm—Stevens, Davis, Miller & Mosher

[57] ABSTRACT

Double bonds in saturated fluoroelastomers consisting of copolymers of vinylidene fluoride with hexafluoropropene and/or chlorotrifluoroethylene, and optionally tetrafluoroethylene, are obtained by reacting the polymer in a solution of a water-insoluble solvent in the presence of an aqueous phase, an inorganic base, and a phase-transfer catalyst.

3 Claims, No Drawings

PROCESS FOR PREPARING UNSATURATED FLUOROELASTOMERS

This application is a continuation-in-part of our co-pending application Ser. No. 836,125, filed Mar. 4, 1986, now abandoned.

DESCRIPTION OF THE INVENTION

The elastomeric copolymers based on vinylidene fluoride (VDF), hexafluoropropene (HFP), and tetrafluoroethylene (TFE) are known from the prior art (see for example British Pat. No. 888,765). Said copolymers do not have double bonds in the polymer chain. Methods for the formation of double bonds in such elastomers are known.

One of these methods, which is described by J. R. Cooper in an article entitled "Fluorine-containing Elastomers" in "High Polymers", Vol. XXIII, page 273, consists in treating the polymer, in solution or in bulk, with mono- or polyfunctional amines. Such method exhibits the drawback of giving rise to an undesired crosslinking of the polymer.

According to other known methods, the double bonds are obtained by reaction of the bulk polymer with inorganic bases (see for example Kirk Othmer, "Encyclopedia of Chemical Technology", Vol. 8, page 508, 1980), or reaction of the polymer with such bases in a dimethylacetamide solution (a method described by W. W. Schmiegel, in Kautsch. Gummi Kunstst., 1978, 31, 137). Theoretical studies carried out with such polymeric solutions in the presence of bases have assumed the formation of double bonds in certain positions of the elastomeric chain without quantitatively defining such bonds or isolating the polymer obtained.

By all of these methods a polymer is obtained which contains residues of inorganic salts and/or of bases in excess, which may represent a drawback in the use in some fields of the electric and electronics industry where vulcanization by means of high-energy electromagnetic radiations is required.

Furthermore, through such methods, and chiefly through those operating with the bulk polymer, it is difficult to stop the reaction at the desired degree. On the other hand, reactions conducted in a solution (see the above cited reference of W. W. Schmiegel) utilize high-boiling solvents such as dimethylacetamide and it is difficult to thoroughly remove the last amounts of solvent unless complicated and repeated dissolution and precipitation steps are carried out, and these are not suited to be carried out on an industrial scale.

It has now been found by the present applicants that it is possible to cause the formation of double bonds in elastomeric copolymers of vinylidene fluoride with hexafluoropropene and/or chlorotrifluoroethylene, and optionally with tetrafluoroethylene, by treating such copolymers dissolved in a suitable solvent under phase-transfer-catalysis conditions (PTC). The technique of reactions via PTC is known in organic chemistry; in particular it is described by E. V. Dehmlow and S. S. Dehmlow in "Phase Transfer Catalysis", Verlag Chemie Ed., Weinheim, 1983. This technique is also described in Kirk-Othmer, Encyclopedia of Chemical Technology, Third Edition, John Wiley and Sons, New York, 1979, Volume 5, pp. 62–68. Such conditions consist in treating, preferably under stirring, a solution of the polymer in a solvent which is water-insoluble or only slightly water-soluble, and stable to alkaline agents under the reaction conditions, in the presence of an aqueous phase, an inorganic base, and a catalyst for PTC.

Even by operating at relatively low temperatures, for example from 0° to 55° C., an unsaturated polymer is thus obtained, which is recoverable from the mixtures by means of conventional techniques, for example by precipitation with non-solvents.

Thus, it is an object of the present invention to provide a process for producing unsaturation in elastomeric copolymers comprising from 55 to 87% by moles of vinylidene fluoride, from 13 to 45% by moles of hexafluoropropene and/or chlorotrifluoroethylene, and from 0 to 27% by moles of tetrafluoroethylene, such process consisting or consisting essentially in treating a solution of such copolymer in a substantially water-insoluble polar solvent with a phase-transfer catalyst, in the presence of water and of an inorganic base.

The term "substantially water-insoluble solvent", whenever used herein, means a solvent having a solubility in water not higher than 15% by weight at the reaction temperature.

As substantially water-insoluble solvents utilizable for the solution of elastomeric copolymer there may be cited, in general, ethers, ketones, and esters which are stable to hydrolysis at the reaction temperature, at the concentration, and with the type of base utilized. Examples of such utilizable solvents are methyl-ter.-butylether, pinacolin, cyclohexanone, etc.

The fluoroelastomer concentration in the solution may range from 1 to 30% by weight.

As catalysts in the PTC reaction, there may be used all those described by E. V. Dehmlow et al in the above-cited article, and preferably quaternary compounds of ammonium and phosphonium.

The quaternary compounds of ammonium and phosphonium that are preferably used in the present invention have the following formulae:

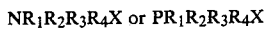

where X is an inorganic or organic anion and $R_1$, $R_2$, $R_3$ and $R_4$, equal to or different from each other, are alkyl, aryl or alkylaryl radicals. The total amount of carbon atoms in the radicals $R_1+R_2+R_3+R_4$ ranges from 15 to 40.

The inorganic anion may be, e.g., $Cl^-$, $Br^-$, $I^-$, $F^-$, $ClO_4^-$, $NO_3^-$, $HSO_4^-$, or $SO_4^-$.

The organic anion may be, e.g., the acetate, the toluenesulfonate, or the benzoate.

Preferred quaternary compounds of ammonium and phosphonium are, e.g., benzyl triphenyl phosphonium chloride, tetrabutyl ammonium chloride, tributyl hexadecyl phosphonium bromide, tributyl benzyl ammonium chloride, benzyl triphenyl phosphonium iodide, benzyl triphenyl phosphonium bromide, tricapryl methyl ammonium chloride, and tetraoctyl ammonium bromide.

Catalyst amounts from 0.2 to 20% by weight, referred to the copolymer weight, are generally employed.

As inorganic bases, the hydroxides of the metals belonging to the 1st and 2nd groups of the Periodic System, and preferably those of Mg, Ca, Ba, K, Na, as well as the bicarbonates and the carbonates of Na and K, are suitable. Such bases are used in the reaction in such amounts that the pH of the aqueous phase is higher than 9, and preferably ranges from 10 to 14.

The volumetric ratio: water/fluoroelastomer solution in the reaction may vary from 10/1 to 1/10, but preferably from 2/1 to 1/3.

The reaction temperature depends on the boiling temperature of the polymer solvent, but generally it varies from 0° to 100° C., and preferably from 5° to 85° C.

At the conclusion of the reaction, the solution of the polymer product containing the double bonds may be washed with water to remove the last traces of inorganic salts, if any, dispersed in the organic phase. This organic phase is used either as such or it is concentrated to prepare films, or poured into a precipitant solvent such as hexane, petroleum ether, methylchloroform, etc. The polymer so obtained in this second case is dried, preferably at 30°–50° C., in a ventilated oven.

The formation of double bonds in the polymer may be qualitatively observed by analysis of the NMR spectrum of $^{19}F$ before and after the treatment, as is described in the above-cited article by W. W. Schmiegel.

The determination of the double bonds may be carried out in a qualitative and in a quantitative manner by means of I.R. spectrophotometric analysis.

The elastomers which have undergone the treatment according to the present invention exhibit typical I.R. absorptions in the area from 1590 to 1760 cm$^{-1}$ in accordance with what is disclosed in the literature for double bonds of this kind.

The use of a reference band (e.g., the reference band at about 3900 cm$^{-1}$) permits one to obtain a quantitative determination of the double bonds.

The fluoropolymers containing double bonds of this invention may be crosslinked with conventional ionic systems or with peroxide systems in the presence of mineral acid acceptors, but under milder conditions than usual owing to the higher reactivity induced by the presence of double bonds as compared with that of a saturated chain.

Particularly advantageous appears the possibility of crosslinking these elastomers by means of ionizing radiations without the need to utilize acid acceptors, and directly attaining the formation of —C— bonds among the different chains.

The operative conditions for accomplishing this type of crosslinking are analogous with those described in literature for other types of polymer, such as for example in "Polymer News", Vol. 6, pages 265-267 (1980); in Radiat. Phys. Chem., 811-821 (1983); and in European patent application No. 71828.

The following examples are given to illustrate the present invention, but without being a limitation thereof.

EXAMPLE 1

10 g of Tecnoflon NML (fluoroelastomer produced by Montefluos and containing about 21% by moles of hexafluoropropene and 79% of vinylidene fluoride, and having a Mooney viscosity of 65±5) were dissolved in 200 ml of methyl-ter.-butylether. 100 ml of demineralized water, 3 g of barium hydroxide, and 0.1 g of benzyltriphenylphosphonium chloride were added to the solution. The solution was stirred during 2 hours at a temperature of 15° C.

The polymer was recovered by precipitation in hexane and dried at 50° C. under vacuum. The double bonds determined by analysis of the fluorine ion were equal to 0.55 moles per 100 moles of monomeric units. The F.T.I.R. spectrum shows the appearance of signals at 1750, 1720 and 1680 cm$^{-1}$.

EXAMPLES 2-13

The following examples report the operating conditions and the results obtained by operating under different double bonds-formation conditions and refer to the use of 10 g of the same fluoroelastomer of Example 1, dissolved in 200 ml of solvent, and 100 ml of water, using (A) 50 milliequivalents or (B) 200 milliequivalents of base and otherwise operating as in Example 1.

The operating conditions and the results obtained are recorded in the following Table I.

TABLE I

| Example | Solvent | Base | Catalyst | Reaction time in hours | Temperature, °C. | Double Bonds formed (moles for 100 moles of monomeric units) |
|---|---|---|---|---|---|---|
| | | A | | | | |
| 2 | MtBE | Ca(OH)$_2$ | BTPPC | 2 | 25 | 0.72 |
| 3 | MtBe | Ca(OH)$_2$ | BTPPC | 4 | 25 | 1.05 |
| 4 | PIN | Ca(OH)$_2$ | BTPPC | 4 | 85 | 2.90 |
| 5 | PIN | Ba(OH)$_2$ | BTPPC | 4 | 85 | 1.32 |
| 6 | MtBE | NaOH | BTPPC | 2 | 53 | 1.10 |
| 7 | MtBE | NaOH | BTPPC | 4 | 53 | 1.52 |
| 8 | MtBE | NaOH | BTPPC | 14 | 53 | 1.90 |
| 9 | MtBE | NaOH | TBAB | 2 | 53 | 1.52 |
| 10 | MtBE | NaOH | TBAB | 4 | 53 | 1.68 |
| | | B | | | | |
| 11 | MtBE | NaOH | TBAB | 2 | 48 | 3.21 |
| 12 | MtBE | NaOH | TBAB | 4 | 48 | 3.55 |
| 13 | MtBE | NaOH | Absent | 4 | 48 | <0.1 |

(comparative)
Note:
BTPPC = benzyl-triphenylphosphonium chloride
TBAB = tetrabutylammonium bromide
MtBE = methyl-tert. butylether
PIN = methyl-tert. butylketone.

The sample from each of Examples 2 to 13 was analyzed through NMR of $^{19}F$. In each case, a decrease of the bands at 75.2 ppm (CF$_3$—) and 108.6 ppm (CF$_2$—) pertaining to the saturated chain

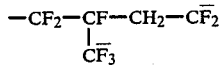

was observed. New signals at 56.8 and 61.6 ppm pertaining to the group $CF_3^-$ on a double bond

appeared.

EXAMPLES 14–17

These were carried out as described in Examples 2-13, but with a polymer concentration equal to 20 g/200 ml of solvent and in the presence of an amount of base equal to 0.8 moles (C) or 0.3 moles (D).

The remaining reaction conditions and the results are reported in Table II.

TABLE II

| Example | Solvent | Base | Catalyst | Reaction time in hours | Temperature, °C. | Double Bonds formed (moles for 100 moles of monomeric units) |
|---|---|---|---|---|---|---|
|  |  | C |  |  |  |  |
| 14 | MtBE | NaOH | BTPPC | 5 | 40 | 22.4 |
| 15 | MtBE | NaOH | TBAB | 2 | 50 | 39.8 |
|  |  | D |  |  |  |  |
| 16 | MtBE | NaOH | TBAB | ½ | 10 | 1.1 |
| 17 | MtBE | NaOH | TBAB | 2 | 10 | 3.4 |

EXAMPLE 18

From a solution of an unsaturated fluoroelastomer obtained according to Example 6 there was prepared, by repeated applications by means of spraying or by a brush, a film having a thickness of about 0.5 mm on two aluminum test pieces ($A_1$) and ($A_2$). A film of the same thickness, prepared from the same solution of saturated fluoroelastomer which was not subjected to the alkaline treatment, was applied onto a third test piece ($A_3$).

Test pieces $A_1$ and $A_3$ were subjected to radiation by means of an electron beam with a dose of 5 Mrad.

The resulting formation of transverse bonds is evidenced by treatment with solvents. After immersion of the three test pieces into methyl-tert.butylether, the films which coated test pieces $A_2$ and $A_3$ were dissolved, while the film on test piece $A_1$ exhibited only a 20% weight increase due to swelling caused by the action of the solvent.

EXAMPLE 19

10 g of a copolymer containing 25% by moles of chlorotrifluoroethylene and 75% of vinylidene fluoride are dissolved in 200 ml of methyl-ter-butylether. To this solution there are added 32 ml of an aqueous 0.3N NaOH solution and 1 g of tributyl hexadecyl phosphonium bromide. The solution is stirred for 10 minutes at a temperature of 20° C.

The polymer was recovered by precipitation in hexane and dried at 40° C. under vacuum.

The double bonds are equal to 7.7 moles per 100 moles of monomeric units. The F.T.I.R. spectrum shows the appearance of one signal at 1721 $cm^{-1}$.

EXAMPLE 20

10 g of a copolymer containing 25% by moles of hexafluoropropene and 75% of vinylidene fluoride are dissolved in 200 ml of cyclohexanone. To this solution there are added 30 ml of an aqueous 0.6N NaOH solution and 1 g of tributyl hexadecyl phosphonium bromide. The solution is stirred during 10 minutes at a temperature of 30° C.

The polymer is recovered by precipitation in hexane and dried at 40° C. under vacuum.

The double bonds are equal to 0.12 moles per mole of monomeric unit.

EXAMPLES 21–27

10 g of a copolymer containing 20% by moles of hexafluoropropene and 80% of vinylidene fluoride are dissolved in 200 ml of methyl ter-butyl ether. To this solution there are added 32 ml of an aqueous 1.2N NaOH solution and 3.5 millimoles of different catalysts (see Table III).

The solution is stirred during 1 hour at the temperature indicated in Table III. The polymers are recovered by precipitation in hexane and dried at 40° C. under vacuum.

The amount of double bonds obtained is reported in Table III.

TABLE III

| Example | Catalyst | Temperature (°C.) | Double bonds formed (moles for 100 moles of monomeric units) |
|---|---|---|---|
| 21 | Tributylbenzyl-ammonium chloride | 50 | 21.3 |
| 22 | Benzyltriphenyl-phosphonium chloride | 48 | 4.2 |
| 23 | Benzyltriphenyl-phosphonium iodide | 51 | 3.2 |
| 24 | Benzyltriphenyl-phosphonium bromide | 50 | 6.7 |
| 25 | Tricaprylmethyl-ammonium chloride | 50 | 23.5 |
| 26 | Tributylhexade-cylphosphonium bromide | 48 | 19.7 |
| 27 | Tetraoctyl ammounium bromide | 48 | 16.4 |

What is claimed is:

1. A process for producing unsaturation in elastomeric copolymers comprising from 55 to 87% by moles of vinylidene fluoride, from 13 to 45% by moles of hexafluoropropene and/or chlorotrifluoroethylene, and from 0 to 27% by moles of tetrafluoroethylene, characterized in that a solution of said copolymer in a substantially water-insoluble polar solvent is treated with an aqueous solution of an inorganic base, in the presence of a phase-transfer catalyst; the concentration of the copolymer in its solution being between 1 and 30% by weight; the volume ratio water/copolymer solution ranging from 10/1 to 1/10; the phase-transfer catalyst being an ammonium quaternary compound having the formula $NR_1R_2R_3R_4X$ or a phosphonium quaternary compound having the formula $PR_1R_2R_3R_4X$, wherein X is an inorganic or organic anion and $R_1$, $R_2$, $R_3$ and $R_4$, equal to or different from each other, are alkyl, aryl or alkylaryl radicals, the total amount of carbon atoms in the radicals $R_1+R_2+R_3+R_4$ ranging from 15 to 40.

2. The process according to claim 1, characterized in that the copolymer solution is treated with the aqueous solution at a temperature ranging from 0° to 100° C.

3. The process according to claim 1, characterized in that the copolymer solution is treated with the aqueous solution at a temperature ranging from 5° to 85° C.

* * * * *